(12) United States Patent
Lentini

(10) Patent No.: US 8,825,666 B1
(45) Date of Patent: Sep. 2, 2014

(54) SPACE-EFFICIENT, DURABLE KEY-VALUE MAP

(75) Inventor: James F Lentini, Woburn, MA (US)

(73) Assignee: NetApp, Inc., Sunnyvale, CA (US)

( * ) Notice: Subject to any disclaimer, the term of this patent is extended or adjusted under 35 U.S.C. 154(b) by 316 days.

(21) Appl. No.: 13/352,110

(22) Filed: Jan. 17, 2012

(51) Int. Cl.
*G06F 7/00* (2006.01)
*G06F 17/30* (2006.01)
*G06F 15/16* (2006.01)

(52) U.S. Cl.
USPC .......................................... 707/747; 707/756

(58) Field of Classification Search
CPC ..................... G06F 17/3033; G06F 17/30569
USPC .................................................. 707/747, 756
See application file for complete search history.

(56) References Cited

U.S. PATENT DOCUMENTS

| | | | | |
|---|---|---|---|---|
| 5,860,136 | A * | 1/1999 | Fenner .................... | 707/999.003 |
| 6,353,820 | B1 * | 3/2002 | Edwards et al. .............. | 707/696 |
| 6,848,029 | B2 * | 1/2005 | Coldewey .................... | 707/999.1 |
| 8,543,554 | B1 * | 9/2013 | Singh et al. .................... | 707/747 |
| 2011/0072187 | A1 * | 3/2011 | Forhan et al. .................. | 711/216 |
| 2011/0225168 | A1 * | 9/2011 | Burroughs et al. ........... | 707/747 |
| 2012/0102298 | A1 * | 4/2012 | Sengupta et al. ............. | 711/216 |
| 2012/0173541 | A1 * | 7/2012 | Venkataramani ............. | 707/747 |

OTHER PUBLICATIONS

Raghu Ramakrishnan and Johannes Gehrke. Database Systems Management, third edition. McGraw-Hill, New York, 2003, Title pages, Preface, Sections 8.1-8.3 and Chapter 11, pp. iii, iv, xxiv-xxviii, 274-282 and 370-390.*

* cited by examiner

*Primary Examiner* — Greta Robinson
*Assistant Examiner* — Brian E. Weinrich
(74) *Attorney, Agent, or Firm* — Perkins Coie LLP

(57) ABSTRACT

A system and method for creating and managing a space-efficient, durable key-value map is disclosed. A key management engine initializes a key-value map by associating a plurality of keys with a first slot of the slots in the key-value map. A first key-value pair is then assigned to the first slot of the key-value map. The key management engine subsequently receives an indication that the first key is to be invalidated; and responsively reuses the first slot of the key-value map by assigning a second key-value pair to the first slot. The first key is then recycled in response to the first key becoming valid. The first and second key-value pairs include respective first and second values and respective first and second keys of the plurality of keys associated with the first slot. The first key becomes valid when it is no longer referenced by a data buffer.

36 Claims, 10 Drawing Sheets

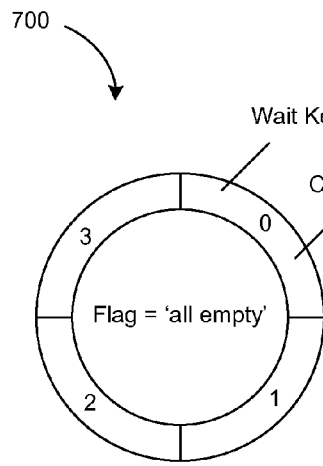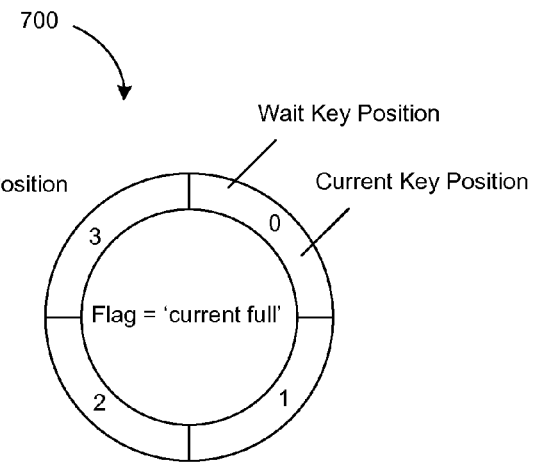
*FIG. 7A*  *FIG. 7B*
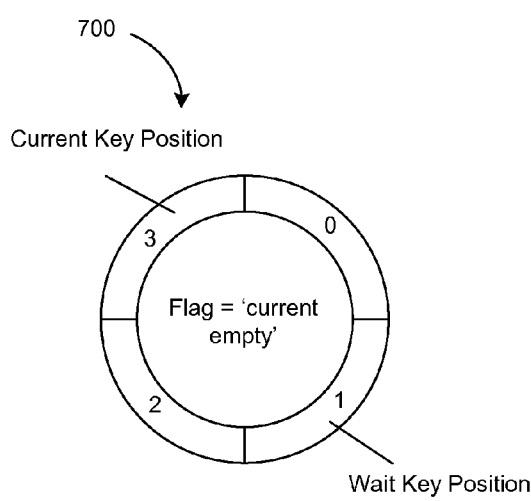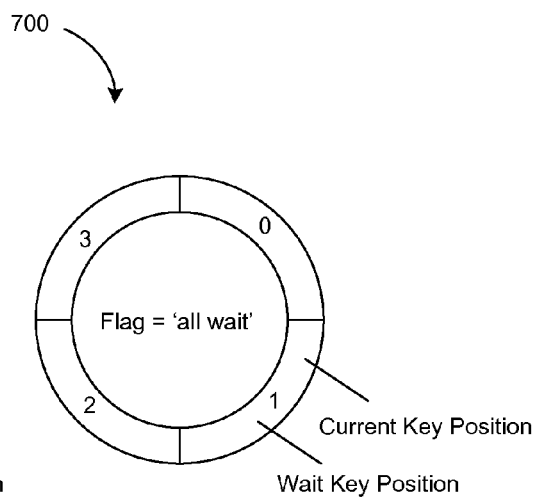
*FIG. 7C*  *FIG. 7D*

SPACE-EFFICIENT, DURABLE KEY-VALUE MAP

FIELD OF THE INVENTION

At least one embodiment of the present invention pertains to data processing systems, and more particularly to creation and management of data structures including a space efficient, durable key-value map.

BACKGROUND

A computer or other type of data processing system can create, maintain, and process data of various data types and can use various types of data structures, such as, for example, key-value maps. A key-value map (or associative array) is a data type or structure that is composed of a collection of key-value pairs. Typically, each key in a key-value map appears at most once in the key-value map. That is, each key is associated with, at most, one slot of the key-value map, where the key-value map comprises a plurality of slots or entries. Further, each slot of a key-value map is associated with a single key. The association between a key and a value is known as a binding. In some cases, binding may also refer to the process of creating a new key-value association.

A number of operations can be defined for a key-value map. These operations can include add operations, remove operations, and lookup operations. An add or insert operation adds a new key-value pair to the map by binding a key to given value. A remove or delete operation removes a key-value pair from the map, unbinding a given key from its value. Given a key, a lookup or get operation locates and returns a value in a key-value map that is bound or associated with the given key if the key is valid.

Key-value maps are sometimes used in conjunction with data buffers. For example, a data buffer can be implemented as a circular buffer such that one or more locations in the data buffer each include a key that references a value in the key-value map. The values stored in the key-value map can be referenced from the data buffer multiple times using the associated keys.

It may be desirable to reuse slots in a key-value map. That is, it may be desirable to immediately assign a new key-value pair to a slot of a key-value map after a bound key-value pair is deleted from that slot. However, reusing slots of a key-value map may not be efficient when the key-value map is used in conjunction with a data buffer, because the slot cannot be reused until the key for that slot is no longer referenced in the corresponding data buffer. For example, when a key is deleted from the key-value map, there may still be multiple references to the key in the data buffer. Accordingly, reusing the slot of the key-value map prior to all of the references being deleted can result in the key-value map incorrectly providing a deleted value in response to a lookup operation. Further, while deleting a key-value pair from a slot of a key-value map is a relatively easy and efficient process, deleting the one or more entries in the buffer that reference the key may not be practical due to performance issues (e.g., assuming each of the now invalid key references must be found and deleted, potentially resulting in an unbounded number of operations). Additionally, if the data buffer is implemented in a flash memory, finding and deleting each of the entries corresponding to the now invalid key can result in excessive flash wear.

One example of a data processing system that may use key-value maps is a network storage controller. A network storage controller is a physical processing device that is used to store and retrieve data on behalf of one or more hosts. A network storage controller can be configured (e.g., by hardware, software, firmware, or any combination thereof) to operate as a storage server that serves one or more clients on a network, to store and manage data in a set of mass storage devices, such as magnetic or optical storage-based disks, tapes, or flash memory. Storage of data in the set of mass storage devices can be implemented as one or more storage volumes defining an overall logical arrangement of disk space.

Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif., employing the Data ONTAP® storage operating system.

Typically, it is beneficial for a storage administrator to be able to add and delete storage containers (e.g., volumes, files, directories or logical units) that have identifiers that are referenced in a key-value map. However, the number of storage containers that can use the data buffer are limited to the number of slots available in a key-value map. Thus, the current methods and systems for reusing slots of a key-value map are not efficient because an administrator must wait for the key to no longer be referenced in the data buffer before reusing the slot of the key-value map, to ensure that data related to a deleted (or invalid) key is not referenced.

SUMMARY

The techniques introduced here provide for a system and method for creating and managing a space-efficient, durable key-value map. A key management engine initializes a key-value map by associating a plurality of keys with a first slot of the slots in the key-value map. A first key-value pair is then assigned to the first slot of the key-value map. The key management engine subsequently receives an indication that the first key is to be invalidated, and responsively reuses the first slot of the key-value map by assigning a second key-value pair to the first slot. The first slot is then recycled in response to the first key becoming valid. The first and second key-value pairs include respective first and second values and respective first and second keys of the plurality of keys associated with the first slot. The first key becomes valid when it is no longer referenced by a data buffer. Accordingly, the key management engine is able to immediately recycle slots in a key-value map regardless of whether the associated deleted key still has an invalid reference in a data buffer.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

FIGS. 7A-7D show examples illustrating a scheme of persistently tracking keys.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The following detailed description is described with reference to a storage system environment; however, it is appreciated that the systems, methods, and data structures described herein are equally applicable to any data processing system utilizing a key-value map in conjunction with a data buffer.

Figure 1:
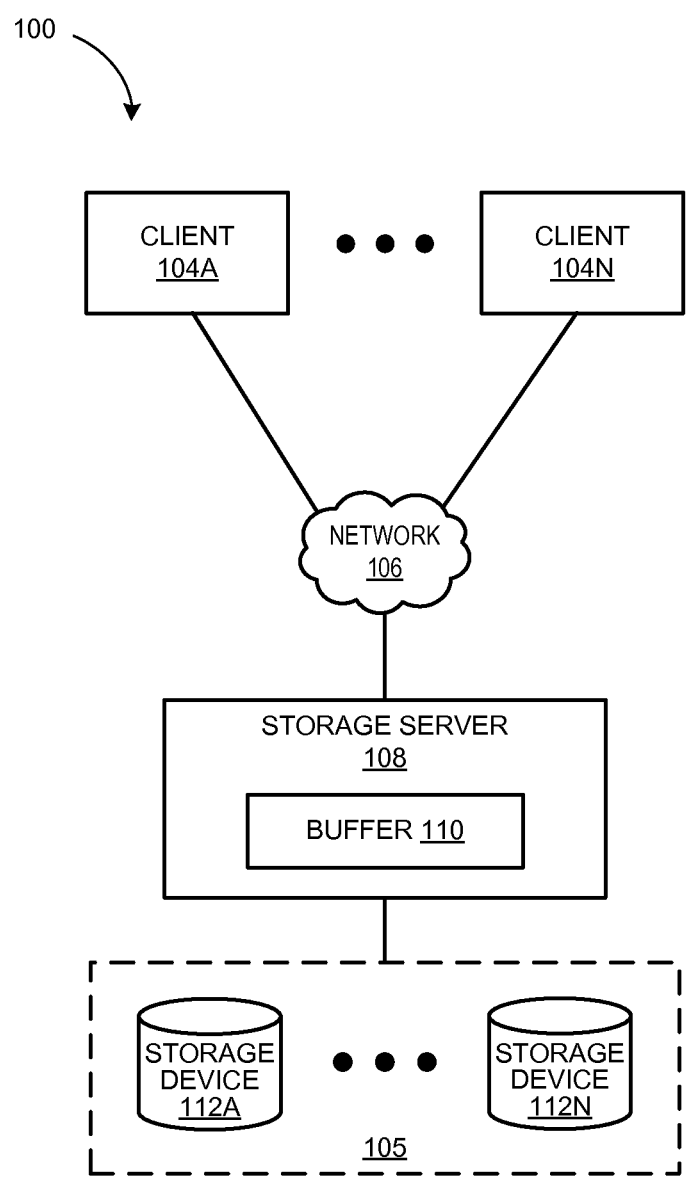
FIG. 1 shows an example of a network storage system.

FIG. 1 shows an example of a network storage system 100, which includes a plurality of client systems 104A-N (collectively referred to herein as "clients 104," or any one client system individually, as "client 104"), a storage server 108, and a network 106 connecting the client systems 104 and the storage server 108. As shown in FIG. 1, the storage server 108 is coupled with a number of mass storage devices (or storage containers) 112A-N (collectively referred to herein as "storage containers 112," or any one storage container individually, as "storage container 112"), such as disks, in a mass storage subsystem 105. Alternatively, some or all of the mass storage devices 112 can be other types of storage, such as flash memory, solid-state drives (SSDs), tape storage, etc. However, for ease of description, the storage devices 112 are assumed to be disks herein.

The storage server 108 can be, for example, one of the FAS-series of storage server products available from NetApp®, Inc. The client systems 104 are connected to the storage server 108 via the network 106, which can be a packet-switched network, for example, a local area network (LAN) or wide area network (WAN). Further, the storage server 108 can be connected to the disks 112 via a switching fabric (not shown), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s). Storage of information in the mass storage subsystem 105 can be implemented as one or more storage volumes that comprise a collection of physical storage disks 112 cooperating to define an overall logical arrangement of volume block number (VBN) space on the volume(s). Each logical volume is generally, although not necessarily, associated with its own file system.

The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used according to the techniques described herein. One or more RAID groups together form an aggregate. An aggregate can contain one or more volumes.

The storage server 108 can receive and respond to various read and write requests from the client systems 104, directed to data stored in or to be stored in the storage subsystem 105. The storage server 108 also includes an internal buffer cache 110, which can be implemented as DRAM, for example, or as non-volatile solid-state memory, such as flash memory. In one embodiment, the buffer cache 110 comprises a host-side flash cache that accelerates I/O. Although not shown, in one embodiment, the buffer cache 110 can alternatively or additionally be included within one or more of the client systems 104.

Although the storage server 108 is illustrated as a single unit in FIG. 1, it can have a distributed architecture. For example, the storage server 108 can be designed as a physically separate network module (e.g., "N-blade") and disk module (e.g., "D-blade") (not shown), which communicate with each other over a physical interconnect. Such an architecture allows convenient scaling, such as by deploying two or more N-blades and D-blades, all capable of communicating with each other through the interconnect.

Further, a storage server 108 can be configured to implement one or more virtual storage servers. Virtual storage servers allow the sharing of the underlying physical storage controller resources, (e.g., processors and memory, between virtual storage servers while allowing each virtual storage server to run its own operating system) thereby providing functional isolation. With this configuration, multiple server operating systems that previously ran on individual machines, (e.g., to avoid interference) are able to run on the same physical machine because of the functional isolation provided by a virtual storage server implementation. This can be a more cost effective way of providing storage server solutions to multiple customers than providing separate physical server resources for each customer.

Figure 2:
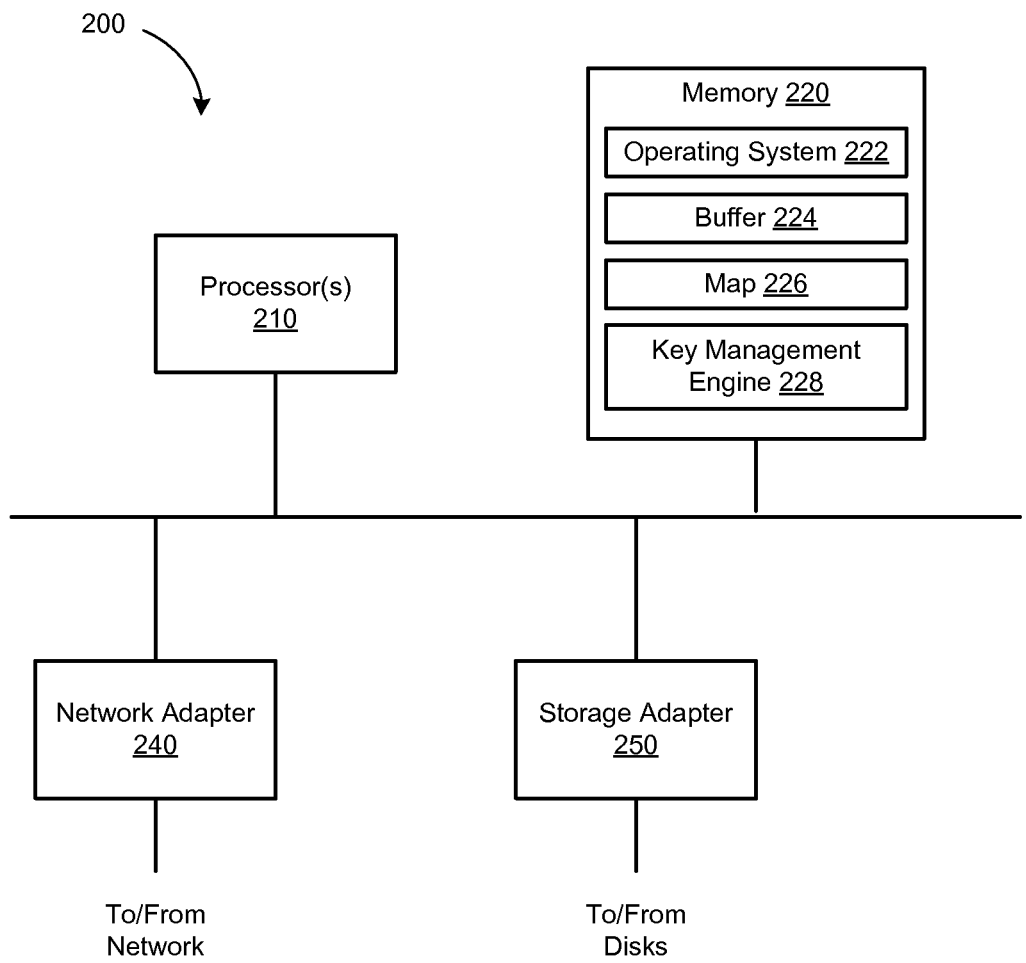
FIG. 2 is a diagram illustrating an example of a storage controller that can implement one or more network storage servers.

FIG. 2 is a diagram illustrating an example of the hardware architecture of a storage controller 200 that can implement one or more network storage servers, for example, storage server 108 of FIG. 1. The storage server is a processing system that provides storage services relating to the organization of information on storage devices, such as disks 112 of the mass storage subsystem 105. In an illustrative embodiment, the storage server 108 includes a processor subsystem 210 that includes one or more processors. The storage server 108 further includes a memory 220, a network adapter 240, and a storage adapter 250, all interconnected by an interconnect 260.

The storage server 108 can be embodied as a single- or multi-processor storage server executing a storage operating system 222 that preferably implements a high-level module, called a storage manager, to logically organize data as a hierarchical structure of named directories, files, and/or data "blocks" on the disks 112.

The memory 220 illustratively comprises storage locations that are addressable by the processor(s) 210 and adapters 240 and 250 for storing software program code and data associated with the techniques introduced here. For example, some of the storage locations of memory 220 can be used as a data buffer 224, a key-value map 226, and a key management engine 228. The data buffer 224 temporarily stores data that is transferred between the clients 104 and the disks 112. Each non-empty entry in buffer 224 includes a key that is associated with a value of a key-value pair. The key-value map 226 stores the key-value pairs. In particular, each slot of the key-value map 226 is identifiable by a plurality of keys and includes a slot header (or meta data) and a slot value (data). The slot header indicates the status (or state) of each of the plurality of keys associated with the slot. At any given time, at most, a single key can be used as the current key (i.e., allocated key or next key to be allocated if all keys are unallocated) for any given slot of the key-value map 226. In some embodiments, each key is associated with a value or identifier (ID) that uniquely identifies a data module. This may be useful if, for example, the size of the identifier is larger than the size of the key. The key management engine 228 includes software code configured to create and maintain the key-value map 226 and the keyspace (i.e., the plurality of keys associated with each slot) using the slot headers. The processor 210 and adapters may, in turn, comprise processing elements and/or logic circuitry configured to execute the software code and manipulate the data structures. Although not shown, in one embodiment, the data buffer 224, the key-value map 226, and/or the key management engine 228 can be included within one or more clients (e.g., client 104 of FIG. 1).

The storage operating system 222, portions of which are typically resident in memory and executed by the processing elements, functionally organizes the storage server 108 by (among other functions) invoking storage operations in support of the storage service provided by the storage server 108. It will be apparent to those skilled in the art that other processing and memory implementations, including various computer readable storage media, may be used for storing and executing program instructions pertaining to the techniques introduced here. Similar to the storage server 108, the storage operating system 222 can be distributed, with modules of the storage system running on separate physical resources.

The network adapter 240 includes a plurality of ports to couple the storage server 108 with one or more clients 104, or other storage servers, over point-to-point links, wide area networks, virtual private networks implemented over a public network (Internet) or a shared local area network. The network adapter 240 thus can include the mechanical components as well as the electrical and signaling circuitry needed to connect the storage server 108 to the network 106. Illustratively, the network 106 can be embodied as an Ethernet network or a Fibre Channel network. Each client 104 can communicate with the storage server 108 over the network 106 by exchanging packets or frames of data according to pre-defined protocols, such as Transmission Control Protocol/Internet Protocol (TCP/IP).

The storage adapter 250 cooperates with the storage operating system 222 to access information requested by the clients 104. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 112. The storage adapter 250 includes a plurality of ports having input/output (I/O) interface circuitry that couples with the disks over an I/O interconnect arrangement, such as a conventional high-performance, Fibre Channel link topology.

The storage operating system 222 facilitates clients' access to data stored on the disks 112. In certain embodiments, the storage operating system 222 implements a write-anywhere file system that cooperates with one or more virtualization modules to "virtualize" the storage space provided by disks 112. In certain embodiments, a storage manager 310 (FIG. 3) element of the storage operation system 222 logically organizes the information as a hierarchical structure of named directories and files on the disks 112. Each "on-disk" file may be implemented as a set of disk blocks configured to store information. As used herein, the term "file" means any logical container of data. The virtualization module(s) may allow the storage manager 310 to further logically organize information as a hierarchical structure of blocks on the disks that are exported as named logical units.

Figure 3:
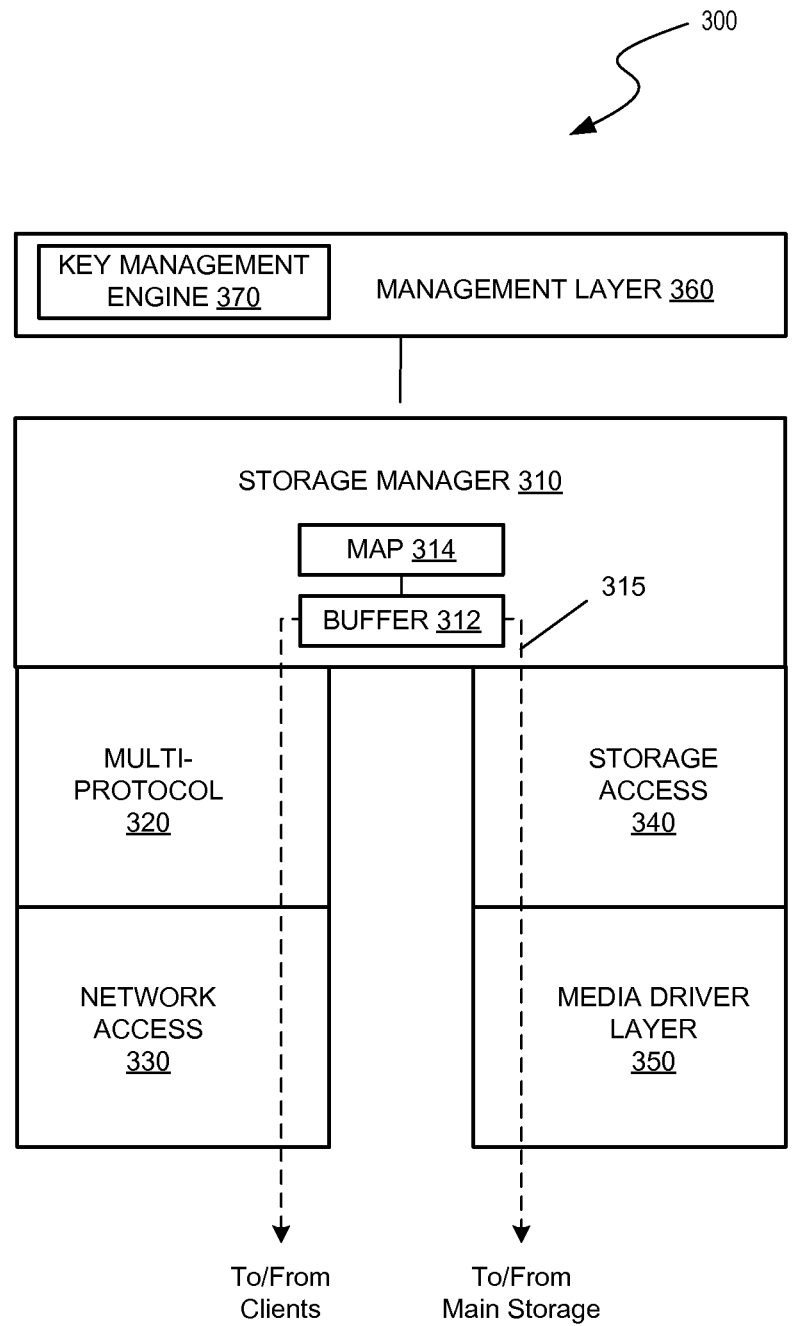
FIG. 3 schematically illustrates an example of the architecture of a storage operating system in a storage server.

FIG. 3 schematically illustrates an example of the architecture 300 of a storage operating system 222 for use in a storage server 108. In one embodiment, the storage operating system 222 can be the NetApp® Data ONTAP™ operating system available from NetApp, Inc., Sunnyvale, Calif. that implements a Write Anywhere File Layout (WAFL™) file system. However, another storage operating system may alternatively be designed or enhanced for use in accordance with the techniques described herein.

The storage operating system 222 can be implemented as programmable circuitry programmed with software and/or firmware, or as specially designed non-programmable circuitry (i.e., hardware), or in a combination thereof. In the illustrated embodiment, the storage operating system 222 includes several modules, or layers. These layers include a storage manager 310, which is the core functional element of the storage operating system 222. The storage manager 310 imposes a structure (e.g., one or more file systems) on the data managed by the storage server 108 and services read and write requests from clients 104.

To allow the storage server to communicate over the network 106 (e.g., with clients 104), the storage operating system 222 also includes a multi-protocol layer 320 and a network access layer 330, logically under the storage manager 310. The multi-protocol layer 320 implements various higher-level network protocols, such as Network File System (NFS), Common Internet File System (CIFS), Hypertext Transfer Protocol (HTTP), and/or Internet small computer system interface (iSCSI), to make data stored on the disks 112 available to users and/or application programs. The network access layer 330 includes one or more network drivers that implement one or more lower-level protocols to communicate over the network, such as Ethernet, Internet Protocol (IP), TCP/IP, Fibre Channel Protocol and/or User Datagram Protocol/Internet Protocol (UDP/IP).

Also, to allow the device to communicate with a storage subsystem (e.g., storage subsystem 105), the storage operating system 222 includes a storage access layer 340 and an associated storage driver layer 350 logically under the storage manager 310. The storage access layer 340 implements a higher-level storage redundancy algorithm, such as RAID-4, RAID-5 or RAID DP®. The storage driver layer 350 implements a lower-level storage device access protocol, such as Fibre Channel Protocol or small computer system interface (SCSI).

Also shown in FIG. 3 is the path 315 of data flow through the storage operating system 222, associated with a read or write operation, from the client interface to the storage interface. Thus, the storage manager 310 accesses the storage subsystem 105 through the storage access layer 340 and the storage driver layer 350. Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

Additionally, in the example of FIG. 3, a data buffer 312 is inserted in the path 315 of data flow through the storage operating system 222. In one embodiment, the data buffer 312 comprises a circular buffer or cache system that acts as a first-in first out (FIFO) queue. The circular buffer is configured to accelerate I/O operations on the main storage 105. The data buffer 312 includes a plurality of entries (see, for example, data buffer 450 of FIG. 4). Each non-empty entry in the data buffer 312 includes a key that corresponds to a specific source (e.g., storage container or disk) in the main storage. A key-value map 314 is used to associate the keys with the identities of the specific sources. That is, to use the circular buffer, an identifier for each source is added to the key-value map so that a key is bound to that identifier. Thus, in such an embodiment the number of sources that can use the circular buffer is limited to the number of slots in the key-value map. In some embodiments, the value bound to the current key in the slot of the key value map is a source identifier (ID) associated with the source. It is appreciated that a key-value map can be used in different manners in other (e.g., non-storage) environments.

The storage operating system 222 includes a management layer 360 that provides a path for a network administrator to request network management operations (e.g., storage system configuration changes, etc.), on the storage system. In one embodiment, the management layer includes a key management engine 370 that creates and maintains the key-value map 314. For example, the key-value map 314 comprises slots that store opaque data blobs or values. Accordingly, these values are only accessible via one or more commands issued from the key-management engine 370. The commands can be a result of one or more system administer initiated operations such as, for example, add, get, and delete operations. Additionally, the key management engine 370 must be able to recognize and track the status of invalid keys. For example, the data buffer, key management engine, or other management engine may issue a get operation to obtain the value bound to an invalidated key. The key-management engine 370 must be able to recognize and communicate the invalidity of the key to the caller (e.g., the data buffer 312 or other management engine) so that the data in the buffer associated with the invalid key is not transferred (e.g., to/from clients or to/from main storage).

Figure 4:
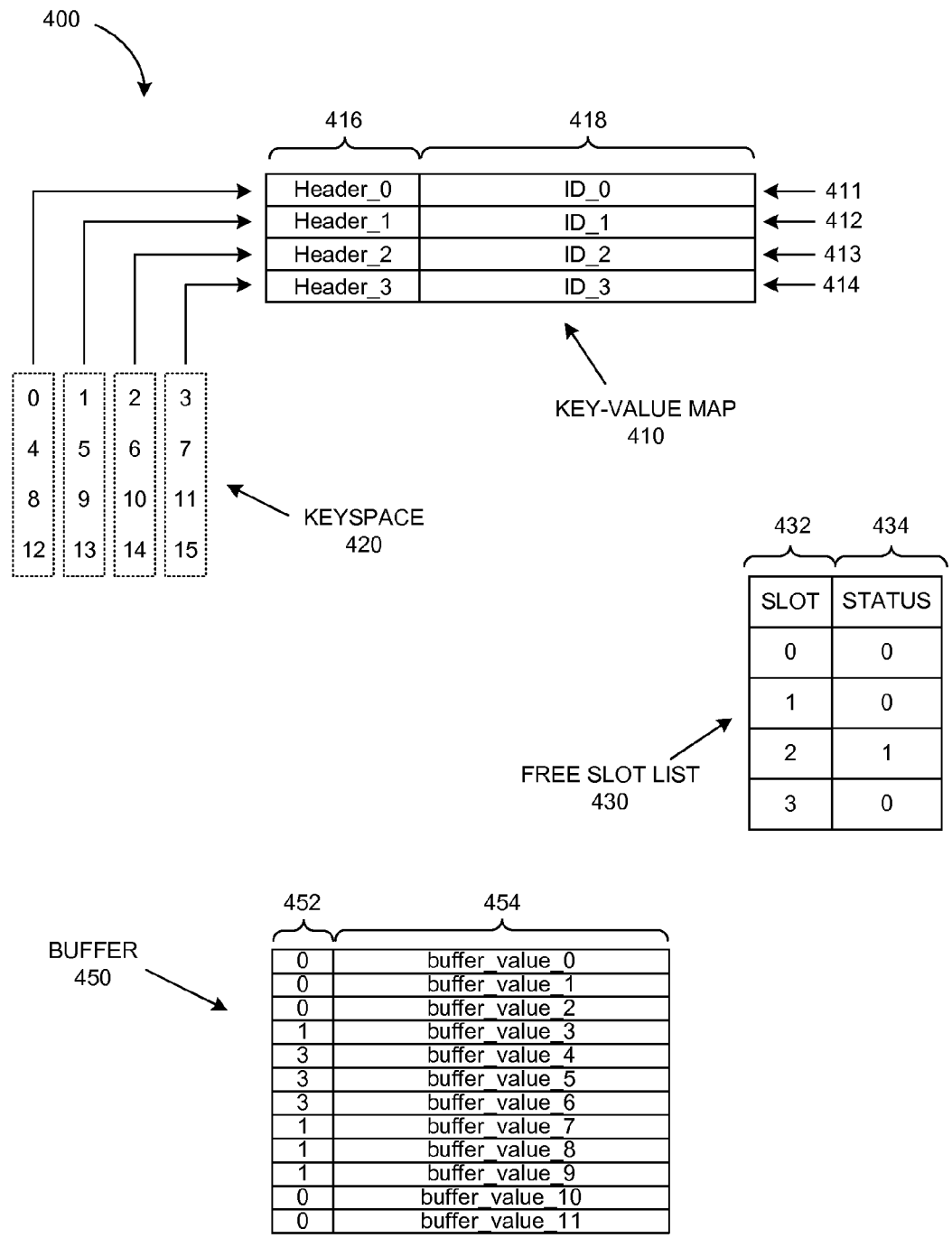
FIG. 4 shows an example of contents of a memory system having at least one data buffer and at least one key-value map stored thereon.

FIG. 4 shows an example of the contents of a memory system 400 that includes at least one data buffer and at least one key-value map stored thereon, for example, memory 220 of FIG. 2. More specifically, FIG. 4 illustrates how associating a plurality of keys with each slot of a key-value map, as described herein, can result in the ability to reuse slot entries when a key-value pair is deleted. Memory system 400 includes a key-value map 410, a keyspace 420, a free slot list 430, and a data buffer 450.

The memory system 400 can comprise one or more persistent memories such as disks, flash memory, solid-state drives (SSDs), tape storage, etc., and/or one or more non-persistent memories such as DRAM. However, it is appreciated that in order to achieve durability, the key-value map 410 must be stored or replicated on one or more persistent memories.

Although not shown for the sake of simplicity, in some embodiments the key-value map 410 includes both in-memory and persistent data structures. The in-memory data structures can be realized using a memory array. Additionally, a persistent copy of the key-value map's in-memory contents can also be stored on a non-volatile storage device. For example, the key-value map 410 can be implemented using flash storage on solid state drives (SSDs). However, it is appreciated that any non-volatile storage medium can be used, including magnetic disk and phase-change memory. The persistent copy can be referred to as the map region. The map region is an array of map entries or slots. A slot's index in the array is its "key."

The key value map 410 is an array indexed from 0 to n−1 where n is equal to the total number of map entries or slots in the key-value map. In the example of FIG. 4, n is equal to 4. Note that n can be any number (i.e., greater than, equal to, or less than 4); the value of n equal to 4 is chosen in this example for ease of description. Continuing with the example of FIG. 4, the key value map 410 includes slots 411-414. The slots 411-414 include slot headers 416 and slot values 418. The slot headers 416 can include a variety of information including information for managing the plurality of keys associated with each slot. That is, at any given time each key of the plurality of keys associated with a slot is in one of three possible states. The states for the keys are tracked by the slot headers 416. The slot headers 416 are discussed in greater detail with reference to FIG. 5.

The slot values 418 are the values or identifiers that are stored with the current key. For example, values can be added to the key-value map 410 or bound to a key when an add operation is received. The add operation adds or associates the current key as defined in the slot header with a value. For example, in embodiments discussed herein related to the storage system environment, a value that is associated with a key can comprise, for example, a disk or storage container identifier. Once the disk or storage container identifier is added to the key-value map 410, then the disk or storage container can be cached or buffered. The disks or storage containers that can be cached or buffered can be a subset of the total number of disks or storage containers in use in some embodiments.

The keyspace 420 includes all of the possible keys that can be used or associated with the slots of key-value map 410. In this example, keyspace 420 includes 16 keys illustratively numbered 0-15. It is appreciated that any number of keys can be used with the key-value map 410 as long as each slot is associated with at least a plurality of keys. The key management engine associates the keys in keyspace 420 with the slots. In one embodiment, the key management engine associates the keys in the keyspace 420 with the slots of the key-value map based on the total number of slots n, where a key k is defined to map or associate to a slot s by the function s=k % n. Thus, given a keyspace with m possible values (e.g., a 32-bit key value can have $2^{32}$ possible values), there are at most ceiling(m/n) possible keys that map to a particular slot.

Accordingly, in the example of FIG. 4, keys 0, 4, 8, and 12 are associated with slot 0 (slot 411); keys 1, 5, 9, and 13 are associated with slot 1 (slot 412); keys 2, 6, 10, and 14 are associated with slot 2 (slot 413); and keys 3, 7, 11, and 15 are associated with slot 3 (slot 414).

The range or number of keys that can be associated with or map to a particular slot can thus be expressed as r=ceiling(m/n), where each of the slot's r keys is in one of three states: unallocated, current, or wait. An individual keys state is determined based on information in the associated slot header 416. In the unallocated state, the key is available to be assigned to a new value (e.g., the key is "free"). In the current state, the slot is currently storing the value for the key. In the wait state, the key has been deleted from the map and is waiting for indication from the buffer that any references to the key have been removed—at which point the key transitions the unallocated state. The state map that tracks the state of each key is discussed in greater detail with reference to FIG. 6.

The key management engine 370 uses the free slot list 430 to track the free slots of the key-value map 410. As shown in FIG. 4, free slot list 430 includes an entry for each slot 432 that indicates a "free" status. Free slots are those slots that are currently in an unallocated state. That is, free slots are those slots that are neither associated with a value in the key-value map nor in the wait state subsequent to having the value previously associated with that key deleted. In some embodiments, the key management engine 370 can keep a separate free slot list 430 for each key-value map. Alternatively or additionally, the key management engine 370 may read the slot headers 416 to determine whether a slot is free. In the example of FIG. 4, a value of "0" indicates that a slot is not available and a value of "1" indicates that a slot is available. Accordingly, in the example of FIG. 4, slot 2 is the only available slot. Because slot 2 (slot 413) of key-value map 410 is available, none of the keys associated with the slot (i.e., keys 2, 6, 10, or 14) are bound to the value (i.e., ID_2).

Each entry in the buffer 450 includes a reference key 452 and a buffer value 454. In the example of FIG. 4, the buffer values 454 are illustrated as buffer_value_1 through buffer_value_11, where each buffer value 454 is data cached from a system, disk, or storage container identifiable by the reference key (i.e., by using the key-value map 410 to obtain the value bound to the key). Although not shown, when the key previously associated with or bound to the value "ID_2" is deleted (e.g., keys 2, 6, 10, or 14), the key management engine 370 either determines the current read location in the buffer 450 and tracks the buffer to identify when there are no more references to the key, or transfers a message to the buffer 450 or a buffer management engine (not shown) to request a notification of when no more references to the key are made in the buffer 450 (i.e., no more references are made to the deleted key in the reference key 452).

Figure 5:
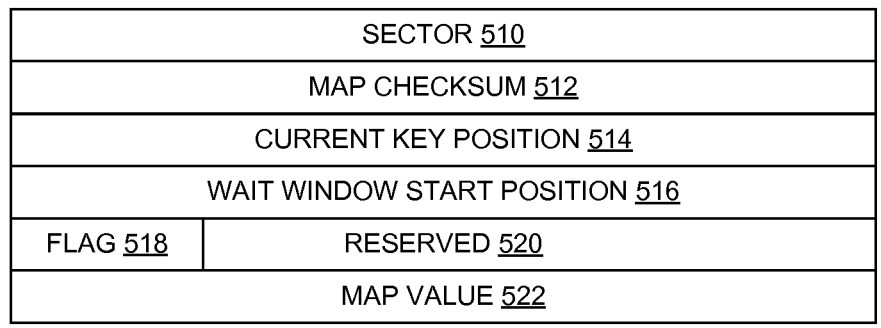
FIG. 5 shows an example of a persistent key-value slot header.

FIG. 5 shows an example of a persistent key-value slot header 500 that includes various fields. Slot header 500 can be a detailed example of one of the slot headers 416 and slot values 418 discussed with reference to FIG. 4; although other configurations are also possible. Slot header 500 includes a sector field 510, a map checksum field 512, a current key position field 514, a wait window start position field 516, a flag field 518, and a reserved field 520. The map value field 522 is also shown which can be, for example, the key value field 418 of FIG. 4. It is appreciated that more or fewer field are possible.

In one embodiment, the sector field 510 represents the sector containing the key-value map slot. The sector field 510 can be used to identify or detect misdirected I/O operations. The map checksum field 512 contains the computed checksum of the map entry. In some cases the checksum may be computed with all zeros for the checksum field 512. The checksum may be used to detect corruption of the map entry. In one embodiment, the sector field 510 and the map checksum field 512 are optional. The map current key position field 514, the wait window start position field 516, and the flag field 518 are used in concert to determine the current state of the keys associated with a slot. The map current key position field 514 indicates the position of the current key. The current key can be indicated numerically (shown in greater detail with reference to FIGS. 7A-7D). The wait window start position field indicates the position of the first key in a wait state. That is, the keys typically enter the wait state on a first-in first-out (FIFO) basis. The wait window indicates the first key of the plurality of keys associated with the slot that entered the wait state. The flag field numerically indicates the state of the slot. For example, the current key position field and the wait window start position field can both be set to the same value when initialized or when all keys are in a wait state. Accordingly, the flag field can indicate when the slot is empty and none of the keys are assigned, when the slot is empty and all of the keys are in wait state, when the current key contains a bonded value, and when the current key does not contain a bonded value. Each key state is discussed in greater detail with reference to FIG. 6.

Figure 6:
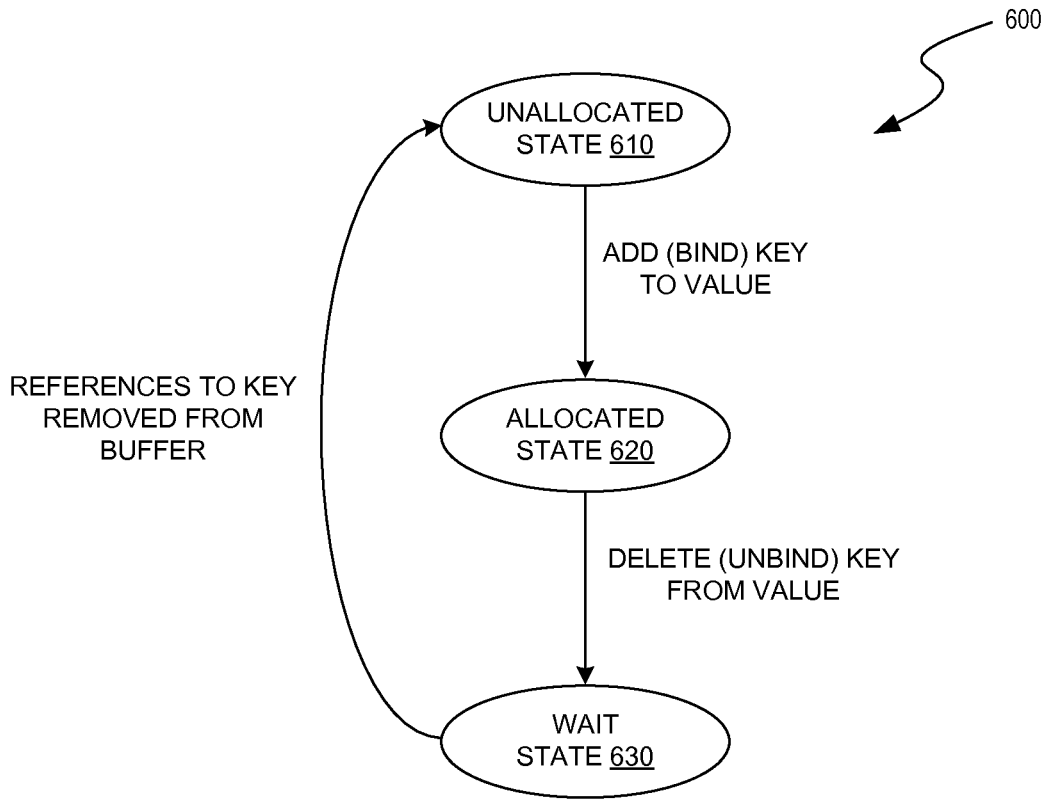
FIG. 6 shows an example state diagram illustrating the various states and state transitions associated with each key of a keyspace.

FIG. 6 shows an example of a state diagram having the various states and state transitions associated with each key of the keyspace, for example, keyspace 420 of FIG. 4. More specifically, FIG. 6 illustrates management of the keys of the keyspace by the management engine on a per slot basis.

Each key of the plurality of keys associated with a slot is always in one of three states: the unallocated state 610, the allocated state 620, or the wait state 630. When initialized by the key management engine, a plurality of keys of the keyspace are associated with each slot. As discussed, each slot has a slot header including various fields. Using FIG. 4 as an example, keys 1, 5, 9, and 13 of keyspace 420, when initialized, are associated with slot 1 of key-value map 410. Association of the keys to the slots can be performed by the key management engine in a number of manners. In this example, the keys are associated based on the function s=k % n. In one embodiment, the header fields associated with slot 1 will be set at initialization. The current key position field is set to 0; the wait window start position field is set to 0; and the flag field is set to 'all empty.' When the flag field is set to 'all empty,' the current key position and the wait window start position fields are ignored. Thus, after initialization, the current key is the key corresponding to position 0. More importantly, after initialization, all of the keys associated with a slot are in unallocated state 610. At any given time, of the plurality of keys associated with the slot, more than one of the plurality of keys, or all of the keys, can be in the unallocated state 610 simultaneously.

In the unallocated state 610, there are no references to the key in the data buffer. Moreover, when in the unallocated state 610, a key is free to be assigned, associated or bound to a new value. When the keyspace management engine receives an add operation indicating a request from a user or system administrator to add or bind a key, one of the keys of the plurality of keys in the unallocated state 610 is bound to the new value and that key is put into the allocated state 620. At any given time, at most, one of the keys of the plurality of keys associated with the slot can be in the allocated state 620. In the current state, the slot is currently storing the value for the key. Further, during the current state, the bound key may be referenced one or more times in the data buffer. These references are valid references or non-dirty references because, in the current state, the key has not yet been deleted.

The key management engine receives a remove operation when, for example, a system administrator wants to remove one of the key-value pairs in the key-value map. The remove operation deletes the key-value pair or unbinds the key value pair. The key can be unbound from the value in the key-value map immediately; however, the key may still be referenced in the data buffer. Thus, after a key is deleted, the key is put into a wait state 630. The wait state 630 is the period after a key has been deleted and before the key has been recycled (i.e., where recycling a key is defined as entering the unallocated state). The key-value map structure can support a wait state of an arbitrary duration. Multiple keys (or all of the keys) associated with a slot of the key-value map can be in wait state 630 simultaneously. However, keys must exit the wait state in the order in which they entered.

During the wait state 630, the key may be referenced one or more times in the data buffer. However, the references to the key are no longer valid because the key has been deleted. Accordingly, these references in the data buffer are referred to as invalid or "dirty" keys. In one embodiment, the wait state can only be exited once all of the invalid keys are guaranteed to be removed from the data buffer. That is, the wait state 630 can only be exited once the invalid references no longer exit. In the case where a circular buffer (or cache) is used, the key management engine can guarantee that the invalid references no longer exists in the circular data buffer once the circular buffer has completed a full rotation. For example, when a delete operation is received at the key management engine, the key management engine puts the key to be deleted in a wait state and concurrently identifies the current read pointer or read location in the circular buffer. As the circular buffer increments, if an invalid key reference is determined to exist in the circular buffer, then the reference is deleted. Thus, when the circular buffer completes a full rotation (i.e., after returning to the original read location), the key management engine can then guarantee that any invalid references to the deleted key have been properly removed. At this point, the state of the key can transition back to the unallocated state. It is appreciated that the data buffer may use other ways to determine when the key is no longer referenced.

FIGS. 7A-7D show examples illustrating a scheme of persistently tracking keys using one or more of the various fields of the persistent key-value slot headers, for example, slot header fields 416 of FIG. 4. More specifically, FIGS. 7A-7D illustrate an example of using the slot header fields to track the state (unallocated, current, or wait) of each of a plurality of key's that are associated with a single slot while the slot is in use. The key tracking is illustrated using a key wheel 700.

Referring first to FIG. 7A, which illustrates the key-wheel 700 for a single slot after initialization or when all the keys are empty (not assigned or bound to a value). In this example, the key-wheel 700 illustrates slot 1 of key-value map 410. The key-wheel 700 includes key locations 0, 1, 2, and 3 corresponding to keys 1, 5, 9, and 13, respectively. As shown in FIG. 7A, the current key position and the wait key position are both set to 0 corresponding to key 1. Further, the flag field in FIG. 7A is set to 'all empty.' Thus, in the example of FIG. 7A, each of the keys 1, 5, 9, and 13 are in the unallocated state 610.

FIG. 7B illustrates key-wheel 700 after a key is bound to a new value. More specifically, key location 0 of slot 1 corresponding to key 1 of keyspace 420 is bound to a new value in the key-value map 410. In this example, the current key position does not change because the current key position (as determined by the current key position field) is already set to 0. However, the flag field is set to 'current full' indicating that the value in the value field is currently bound to the key indicated by the current key position field. The wait key position remains unchanged. In this case, key 1 of the keyspace 420 is in the allocated state and the remaining keys associated with slot 1 (i.e., keys 5, 9, and 13) remain in the unallocated state.

FIG. 7C illustrates key-wheel 700 after the key-value pair assigned in FIG. 7B is deleted, a new key-value pair is assigned and deleted, and another new key value pair is assigned and deleted. More specifically, the value associated or bound to key 1 in FIG. 7B is first deleted. Although not shown, at this point the current key position is incremented from key location 0 corresponding to key 1 to key location 1 corresponding to key 5 and the flag field is set to 'current empty' indicating that the current key position field is not currently filled. Moreover, because key 1 was deleted, the state of the key is changed from the allocated state 620 to a wait state 630. As previously discussed, when a key is deleted or in the wait state 630, the key management engine either tracks the data buffer or requests a notification from a data buffer manager (not shown) for an indication of when there are no longer references to the deleted key in the data buffer. In this example, the key management engine requests a notification of when data buffer 450 no longer includes references to key 1.

A new value is then bound to or assigned to key 5 (corresponding to key location 1 in the key-wheel 700) of the key-value map and subsequently deleted. Although not shown, at this point the current key position in the key-wheel 700 is incremented from key location 1 corresponding to key 5 to key location 2 corresponding to key 9. The flag is set to 'current empty' and because key 5 is deleted, it is placed in the wait state 630. Another new key value pair is then bound to or assigned to key 9 (corresponding to key location 2 in the key-wheel 700) of the key-value map and subsequently deleted. The flag is set to 'current empty' (after being set to 'current full' when the value is bound to key 9) and because key 9 is deleted, it is placed in the wait state 630.

Also shown in this example, subsequent to the value assigned to or bound to key 1 corresponding to key location 0 being deleted, the key management engine receives the indication that key 1 is no longer referenced in the data buffer. Accordingly, the key management engine transitions key 1 from the wait state 630 back to the unallocated state 610. It is appreciated that this indication may arrive anytime after key 1 is placed in the wait state 630 and has no relation to the other keys being bound and/or deleted. Thus, as shown in FIG. 7C, keys 1 and 13 are in the unallocated state 610, and keys 5 and 9 are in the wait state 630.

FIG. 7D illustrates key-wheel 700 after a third key-value pair is added and deleted and a fourth key-value pair is added and deleted. As previously discussed, after each key is deleted it is transitioned to the wait state 630. Thus, as shown, in FIG. 7D all of the keys associated with slot 1 (i.e., keys 1, 5, 9, and 13) are in the wait state. The keys will be removed from the wait state as indicators are received that the keys are no longer referenced in the data buffer. In this case, the keys will be transitioned from the wait state 630 to the unallocated state 610 in the order in which the keys entered the wait state (i.e., in the following order: key 5, key 9, key 13, and, key 1).

Figure 8:
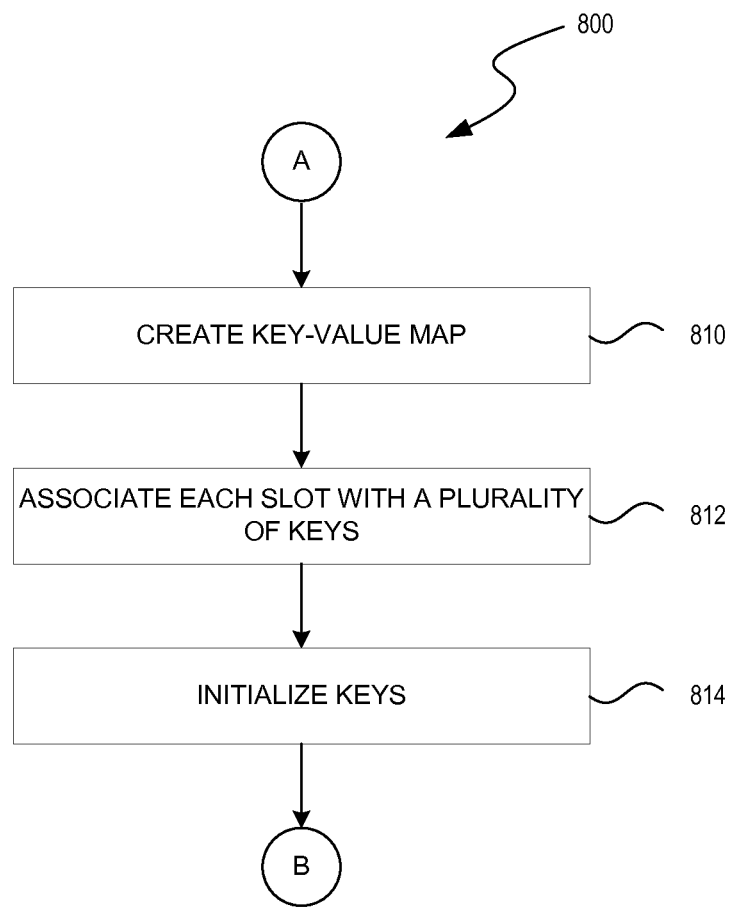
FIG. 8 is a flow diagram illustrating an example process for initializing a key-value map and data buffer.

FIG. 8 is a flow diagram illustrating an example process 800 for creating and initializing a key-value map, for example, the key-value map 410 of FIG. 4. The key management engine, among other functions, creates and maintains the key-value map.

In one embodiment, the key management engine creates and initializes the key-value map including associating a plurality of keys with each slot of the key-value map. In the creation stage, at step 810, the key management engine creates the key-value map by allocating a plurality of slots in a memory. In the association stage, at step 812, the key management engine associates a plurality of keys of the keyspace with each slot of the key-value map. It is appreciated that the key management engine may associate the plurality of keys of the keyspace with each slot of the key-value map in any number of ways including, in one embodiment, associating the plurality of keys of the keyspace to each slot based on the function s=k % n. In the initialization stage, at step 814, the key management engine initializes the plurality of keys for each slot by setting the slot header values to default values. In one embodiment, the initialization stage is optional or combined with the association stage.

Figure 9:
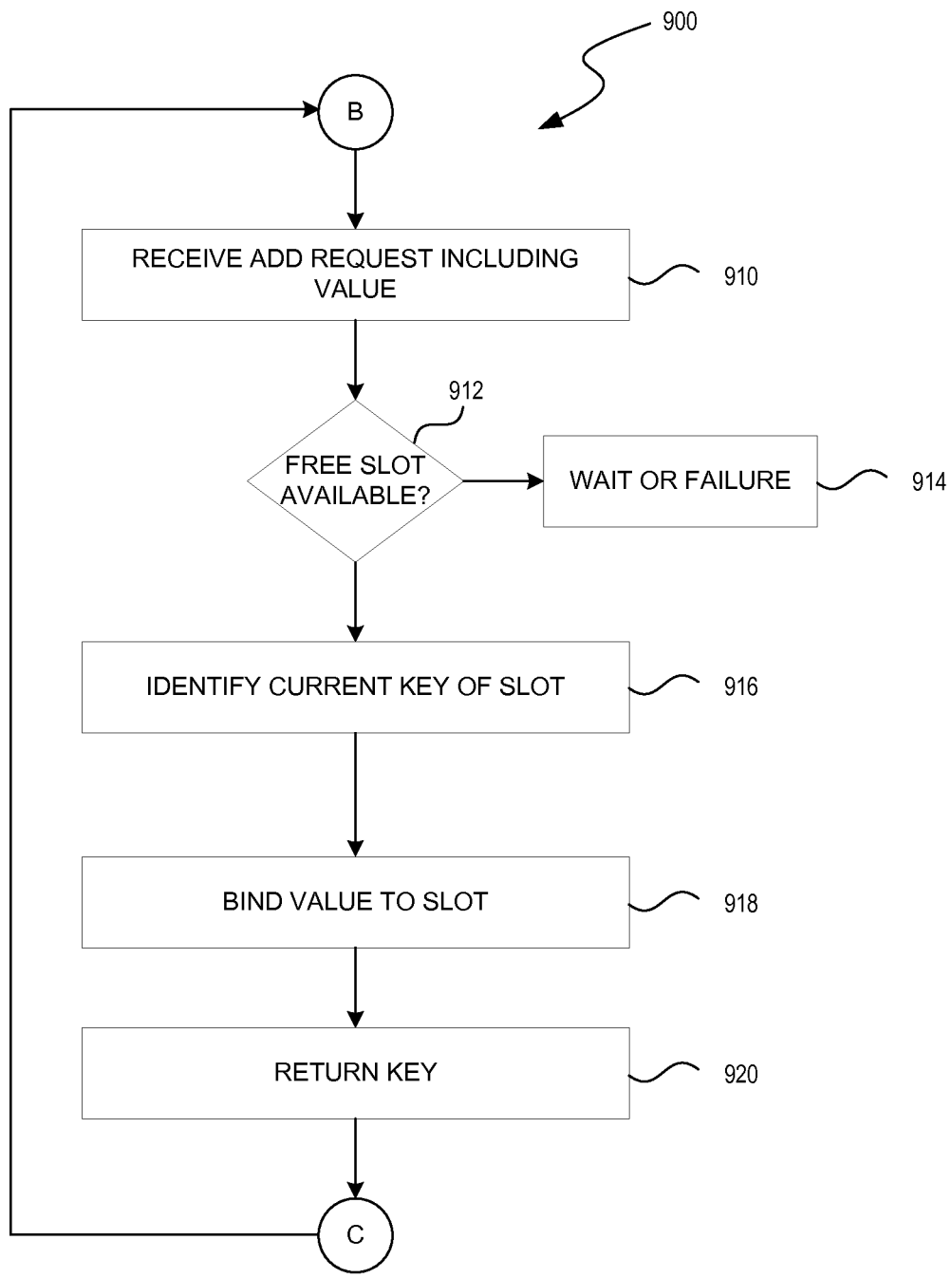
FIG. 9 is a flow diagram illustrating an example process for adding a key-value pair to a key-value map.

FIG. 9 is a flow diagram illustrating an example of a process 900 for adding a key-value pair to a key-value map, for example, the key-value map 410 of FIG. 4. The key management engine, among other functions, receives requests to add or bind values to keys of a key-value map and performs the process 900.

In one embodiment, the key management engine receives a value, associates or binds the value with a key of the key-value map (if a slot is available) and returns the bound key. In the receiving stage, at step 910, the key management engine receives a bind or add request including a value to be bound. The request can be received from a system user or administrator. In one embodiment, a system administrator provides the name or identification of a storage container or system that the system administrator would like to cache (i.e., use the circular data buffer).

The key management engine, at step 912, determines whether a free slot is available. In one embodiment, the key management engine uses a free slot list to determine whether a free slot is available. If a free slot is not available, at step 914, the key management engine either waits for a free key to become available or returns a failure message to the system administrator. A free slot may not be available if a number of keys from one or more slots are in the wait state and/or if all of the slots currently have keys in the allocated state (i.e., the slots already have a value bound to one of the plurality of keys associated with the slot). If a free slot is available, in the identification stage, at step 916, the key management engine identifies the current key of the slot using the slot header information.

In the binding stage, at step 918, the key management engine binds the identified current key with the value. In one embodiment, the key management engine binds the identified current key by updating the header information for the slot and writing the header information and the value to the slot. Lastly, at the return stage, step 920, the key management engine returns the key to which the provided value is now bound in the key-value map. In one embodiment, the returned key can then be used to identify I/O operations from the identified storage container. The process then returns.

Figure 10:
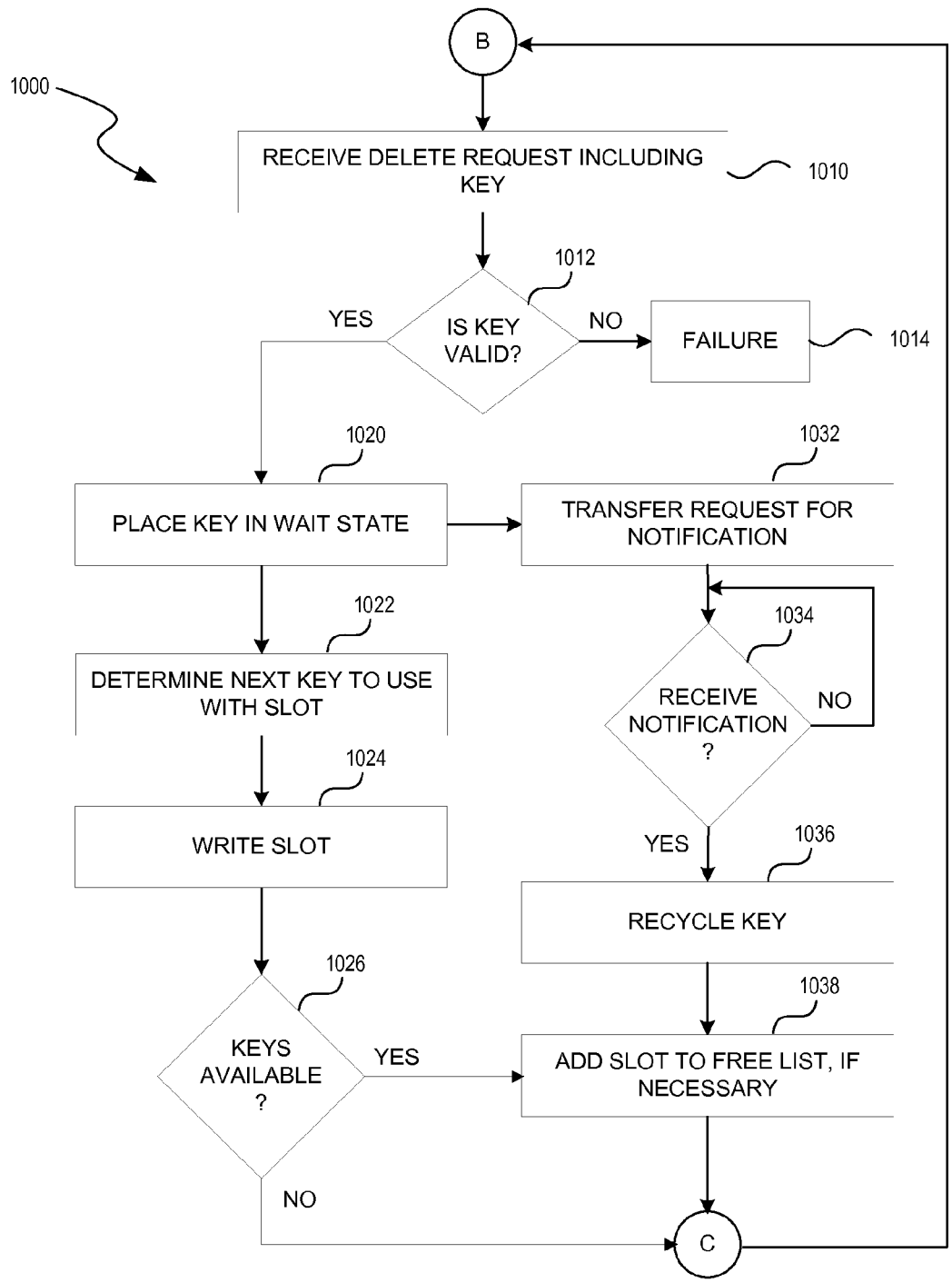
FIG. 10 is a flow diagram illustrating an example process of deleting a key-value pair from a key-value map.

FIG. 10 is a flow diagram illustrating an example process 1000 of deleting a key-value pair from a key-value map, for example, the key-value map 410 of FIG. 4. The key management engine, among other functions, receives requests to delete or remove a bound key-value pair from a key-value map and performs the process 1000.

In one embodiment, the key management engine receives a key, identifies the associated slot, and deletes the key-value pair binding if the key is valid. The key management engine also recycles the deleted key and can reuse the deleted slot immediately. In some examples, the value may be removed from the key-value pair. In other cases, the slot header information may simply be updated to reflect that the given key is no longer valid (i.e., put into the wait state). In the receiving stage, at step 1010, the key management engine receives a delete or unbind request including the key associated with the key-value pair to be unbound. In one embodiment, a system administrator provides an instruction to remove a storage container from caching and the key management engine first determines the key associated with the storage container.

Once the key management engine receives and/or identifies the key to be deleted, at step 1012, the key management engine determines whether the key is valid. If the key is not valid then, at step 1014, the key management engine returns a failure message (e.g., to the system administrator and/or the calling module).

If the key is valid then, in the wait state determination stage, at step 1020, the current key is placed in a wait state. In the slot determination stage, at step 1022, the key management engine determines the next key to use with the slot (e.g., the next key that will be bound for that slot). In one embodiment, the keys are used in a specific order. For example, the keys may be used in the order in which the keys become available (i.e., the order in which they are recycled or enter the unallocated state). In one embodiment, the key with the lowest number available is used. In some examples, the next available key will not be currently available. It is appreciated that there many possibilities for determining the next key to use with the slot.

In the write stage, at step 1024, the slot header information is updated by writing the updated slot header information including the updated slot header information. At step 1026 the key management engine determines whether additional keys are available for use for the slot (e.g., whether the flag field for the slot is not set to 'all wait'). If keys are remaining, at step 1038, the key management engine adds the slot to the free slot list. Otherwise, the process returns.

From the wait stage, at step 1032, the key management engine transfers a request for notification. The request for notification indicates when the deleted key is no longer referenced in the data buffer. In one alternative embodiment, the key management engine monitors the buffer itself to determine when the deleted key is no longer referenced. At step 1034, the key management engine determines if the notification has been received. If the notification has been received, at step 1036, the deleted key can be recycled (i.e., transitioned from the wait state to the unallocated state). At step 1038, the key management engine adds the slot to the free slot list if all of the keys were in the wait state before this notification was received (i.e., flag field set to 'all wait'). The process then returns.

Figure 11:
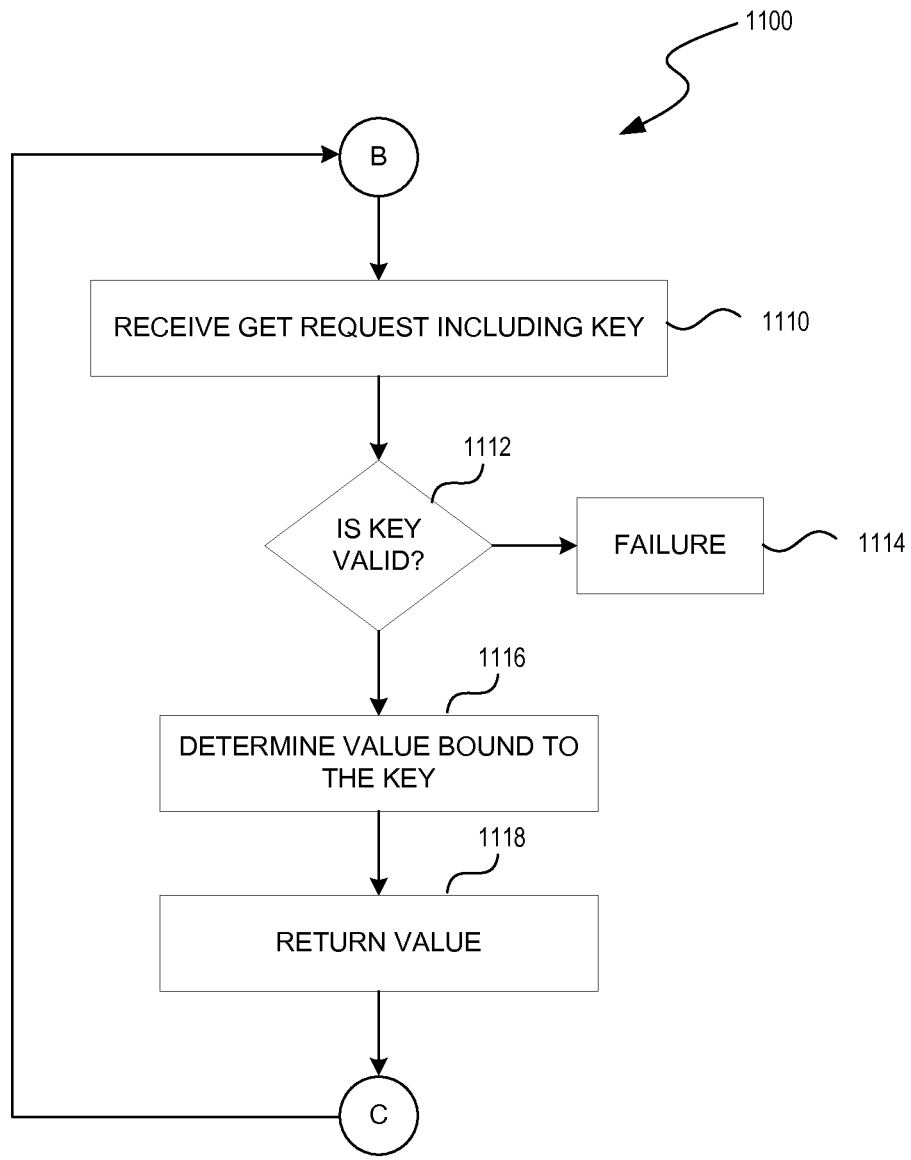
FIG. 11 is a flow diagram illustrating an example process of getting or looking up a value associated with a key of key-value pair from a key-value map.

FIG. 11 is a flow diagram illustrating an example process 1100 of getting or looking up a value associated with a key of key-value pair from a key-value map, for example, key-value map 410 of FIG. 4. The key management engine, among other functions, receives requests to get or lookup a value of a bound key-value pair from a key-value map.

In one embodiment, the key management engine receives a key, identifies the associated slot, and reads and returns the value bound to the key if the key is valid. In the receiving stage, at step 1110, the key management engine receives a get or lookup request including a key. The get or lookup operation can be received from the data buffer, for example, data buffer 450 of FIG. 4, or from a data buffer management engine (not shown). The request can also be received from a system administrator. Once the key management engine receives or identifies the request, at step 1112, the key management engine determines whether the key is valid. If the key is not valid then, at step 1114, the key management engine returns a failure message (e.g., to the system administrator and/or the calling module). If the key is valid then, in the determination stage, at step 1116, the key management engine determines the value bound to the key and, at step 1118, the key management engine returns the value.

The processes described herein are organized as sequences of operations in the flowcharts. However, it should be understood that at least some of the operations associated with these processes potentially can be reordered, supplemented, or substituted for, while still performing the same overall technique.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
associating, by a key management engine of a data processing system, a slot of a key-value map with a plurality of keys;
assigning, by the key management engine, a first key-value pair to the slot of the key-value map, the first key-value pair including a first value and a first valid key of the plurality of keys associated with the slot;
receiving, by the key management engine, an indication that a first key is to be invalidated and, in response, setting a status of the first key to invalid;
in response to the first key becoming invalid, reusing, by the key management engine, the slot of the key-value map by assigning to the slot a second key-value pair including a second value and a second valid key of the plurality of keys associated with the slot, wherein the first key is referenced by one or more entries of a circular buffer, each of the one or more entries of the circular buffer including a reference to the first key and buffered data;
in response to setting the status of the first key to invalid, tracking, by the key management engine, progress of the circular buffer; and
setting, by the key management engine, the status of the first key to valid when the first key is no longer referenced by the one or more entries of the circular buffer, wherein the first key is no longer referenced by the one or more entries of the circular buffer after a full rotation of the circular buffer.

2. The method as recited in claim 1, wherein the indication that the first key is to be invalidated comprises a request to delete the first key-value pair.

3. The method as recited in claim 1, wherein the one or more entries of the circular buffer use the first key to identify the slot of the key-value map containing the first value of the first key-value pair.

4. The method as recited in claim 1, further comprising:
reusing, by the key management engine subsequent to said setting the status of the first key to valid, the first key by assigning to the slot a third key-value pair, the third key-value pair including a third value and the first key of the subset of the plurality of keys.

5. The method as recited in claim 1, further comprising:
receiving, by the key management engine, a key-value request including the first key; and
determining, by the key management engine, whether the first key is valid.

6. The method as recited in claim 5, further comprising transferring, by the key management engine, an error message if the first key is invalid.

7. The method as recited in claim 5, further comprising transferring, by the key management engine, the value of the key-value pair associated with the first key if the first key is valid.

8. The method as recited in claim 1, wherein the method is embodied in a non-transitory machine-readable data processing medium as a set of instructions which, when executed by a processor, cause the processor to perform the method.

9. A method comprising:
associating, by the key management engine of a data processing system, each slot of a plurality of slots of a key-value map with a plurality of keys;
assigning, by the key management engine, to each slot of the key-value map an initial key of each subset of the plurality of keys;
assigning, by the key management engine, to a first slot of the plurality of slots in the key-value map an initial value;
receiving, by the key management engine, subsequent to said assigning, an indication that one of the initial keys associated with the first slot is to be invalidated;
receiving, by the key management engine subsequent to said reusing, an indication that the previously presented key is to be invalidated;
in response to receiving the indication that the previously presented key is to be invalidated, determining that the key is associated with the first slot and setting a status of the previously presented key to invalid;
transferring, by the key management engine, a request to receive a notification when the previously presented key is no longer referenced by one or more entries of a circular buffer;
reusing, by the key management engine, the first slot in the key-value map by assigning to the first slot a previously presented value; and
recycling, by the key management engine, subsequent to receiving the indication that the one of the initial keys associated with the first slot is to be invalidated, the first slot in the key-value map by assigning the first slot a previously presented key of the subset of keys associated with the first slot.

10. The method as recited in claim 9, wherein receiving the indication that the one of the initial keys associated with the first slot is to be invalidated further comprises determining that the one of the initial keys is associated with the first slot.

11. The method as recited in claim 9, further comprising:
in response to receiving the indication that the one of the initial keys associated with the first slot is to be invalidated, setting, by the key management engine, a status of a first key to invalid.

12. The method as recited in claim 9, further comprising:
creating, by a key management engine, the key-value map of the data processing system by allocating the plurality of slots in a memory of the data processing system.

13. The method as recited in claim 9, further comprising:
receiving, by the key management engine, the notification that the previously presented key is no longer referenced by the one or more entries of the circular buffer after a full rotation of the entries of the circular buffer; and
reusing, by the key management engine subsequent to said receiving the notification, the previously presented key by assigning to the first slot the previously presented key.

14. The method as recited in claim 9, further comprising creating, by a buffer management engine of a data processing system, the circular buffer of the data processing system by allocating the plurality of entries in the memory of the data processing system for the circular buffer.

15. The method as recited in claim 9, wherein the keys are mutually exclusive.

16. A system comprising:
a processor;
a memory unit having instructions stored thereon that, when executed by the processor, cause the system to:
associate a slot of a key-value map with a plurality of keys;
assign a first key-value pair to the slot of the key-value map, the first key-value pair including a first value and a first valid key of the plurality of keys associated with the slot;
set a status of the first key to invalid in response to receiving an indication that the first key is to be invalidated;
in response to the first key becoming invalid, reuse the slot of the key-value map by assigning to the slot a second key-value pair including a second value and a second valid key of the plurality of keys associated with the slot, wherein the first key is referenced by one or more entries of a circular buffer, each of the one or more entries of the circular buffer including a reference to the first key and buffered data;
track progress of the circular buffer in response to setting the status of the first key to invalid; and
set the status of the first key to valid when the first key is no longer referenced by the one or more entries of the circular buffer, wherein the first key is no longer referenced by the one or more entries of the circular buffer after a full rotation of the circular buffer.

17. The system recited in claim 16, wherein the indication that the first key is to be invalidated comprises a request to delete the first key-value pair.

18. The system recited in claim 16, wherein the one or more entries of the circular buffer use the first key to identify the slot of the key-value map containing the first value of the first key-value pair.

19. The system recited in claim 16, wherein the instructions, when executed by the processor, further cause the system to reuse the first key by assigning to the slot a third key-value pair, the third key-value pair including a third value and the first key of the subset of the plurality of keys.

20. The system recited in claim 16, wherein the instructions, when executed by the processor, further cause the system to determine if a first key received with a first key-value request is valid.

21. The system recited in claim 20, wherein the instructions, when executed by the processor, further cause the system to transfer an error message if the first key is invalid.

22. The system recited in claim 20, wherein the instructions, when executed by the processor, further cause the system to transfer the value of the key-value pair associated with the first key if the first key is valid.

23. A method comprising:
associating, by a key management engine of a data processing system, a slot of a key-value map with a plurality of keys;
assigning, by the key management engine, a first key-value pair to the slot of the key-value map, the first key-value pair including a first value and a first valid key of the plurality of keys associated with the slot;
in response to the first key becoming invalid, reusing, by the key management engine, the slot of the key-value map by assigning to the slot a second key-value pair including a second value and a second valid key of the plurality of keys associated with the slot, wherein the first key is referenced by one or more entries of a circular buffer, each of the one or more entries of the circular buffer including a reference to the first key and buffered data;
in response to setting the status of the first key to invalid, tracking, by the key management engine, progress of the circular buffer; and
setting, by the key management engine, the status of the first key to valid when the first key is no longer referenced by the one or more entries of the circular buffer, wherein the one or more entries of the circular buffer use the first key to identify the slot of the key-value map containing the first value of the first key-value pair.

24. The method recited in claim 23, wherein the indication that the first key is to be invalidated comprises a request to delete the first key-value pair.

25. The method recited in claim 23, wherein the first key is no longer referenced by the one or more entries of the circular buffer after a full rotation of the circular buffer.

26. The method recited in claim 23, wherein the instructions, when executed by the processor, further cause the system to reuse the first key by assigning to the slot a third key-value pair, the third key-value pair including a third value and the first key of the subset of the plurality of keys.

27. The method recited in claim 23, wherein the instructions, when executed by the processor, further cause the system to determine if a first key received with a first key-value request is valid.

28. The method recited in claim 27, wherein the instructions, when executed by the processor, further cause the system to transfer an error message if the first key is invalid.

29. The method recited in claim 27, wherein the instructions, when executed by the processor, further cause the system to transfer the value of the key-value pair associated with the first key if the first key is valid.

30. A method comprising:
associating, by a key management engine of a data processing system, a slot of a key-value map with a plurality of keys;
assigning, by the key management engine, a first key-value pair to the slot of the key-value map, the first key-value pair including a first value and a first valid key of the plurality of keys associated with the slot;

in response to the first key becoming invalid, reusing, by the key management engine, the slot of the key-value map by assigning to the slot a second key-value pair including a second value and a second valid key of the plurality of keys associated with the slot, wherein the first key is referenced by one or more entries of a circular buffer, each of the one or more entries of the circular buffer including a reference to the first key and buffered data;

in response to setting the status of the first key to invalid, tracking, by the key management engine, progress of the circular buffer; and setting, by the key management engine, the status of the first key to valid when the first key is no longer referenced by the one or more entries of the circular buffer;

reusing, by the key management engine, subsequent to said setting the status of the first key to valid, the first key by assigning to the slot a third key-value pair, the third key-value pair including a third value and the first key of the subset of the plurality of keys.

31. The method recited in claim 30, wherein the indication that the first key is to be invalidated comprises a request to delete the first key-value pair.

32. The method recited in claim 30, wherein the first key is no longer referenced by the one or more entries of the circular buffer after a full rotation of the circular buffer.

33. The method recited in claim 30, wherein the instructions, when executed by the processor, further cause the system to reuse the first key by assigning to the slot a third key-value pair, the third key-value pair including a third value and the first key of the subset of the plurality of keys.

34. The method recited in claim 30, wherein the instructions, when executed by the processor, further cause the system to determine if a first key received with a first key-value request is valid.

35. The method recited in claim 34, wherein the instructions, when executed by the processor, further cause the system to transfer an error message if the first key is invalid.

36. The method recited in claim 34, wherein the instructions, when executed by the processor, further cause the system to transfer the value of the key-value pair associated with the first key if the first key is valid.

* * * * *